United States Patent
Shih et al.

(10) Patent No.: US 8,364,990 B2
(45) Date of Patent: Jan. 29, 2013

(54) REMOTE CONTROLLED POWER SUPPLY SYSTEM

(75) Inventors: Tsun-Te Shih, Taipei Hsien (TW); Yu-Yuan Chang, Taipei Hsien (TW); Heng-Chia Chang, Taipei Hsien (TW); Chieh Yang, Taipei Hsien (TW); Kuang-Lung Shih, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 445 days.

(21) Appl. No.: 12/632,274

(22) Filed: Dec. 7, 2009

(65) Prior Publication Data
US 2011/0138199 A1    Jun. 9, 2011

(51) Int. Cl.
*G06F 1/00*    (2006.01)
(52) U.S. Cl. ....................................................... 713/310
(58) Field of Classification Search .................. 713/310
See application file for complete search history.

(56) References Cited

U.S. PATENT DOCUMENTS

| | | | |
|---|---|---|---|
| 7,574,288 B2 * | 8/2009 | Kawase et al. ..................... 701/1 |
| 8,018,349 B1 * | 9/2011 | Getker et al. .................. 340/660 |
| 2001/0005894 A1 * | 6/2001 | Fukui ............................ 713/310 |
| 2008/0086649 A1 * | 4/2008 | Hublitz et al. ................. 713/310 |
| 2010/0064170 A1 * | 3/2010 | Gross et al. ...................... 714/14 |
| 2010/0211811 A1 * | 8/2010 | Zhou et al. ..................... 713/330 |
| 2011/0025129 A1 * | 2/2011 | Humphrey et al. ............. 307/64 |

* cited by examiner

*Primary Examiner* — Thomas Lee
*Assistant Examiner* — Xuxing Chen
(74) *Attorney, Agent, or Firm* — Muncy, Geissler, Olds & Lowe, PLLC

(57) ABSTRACT

A remote controlled power supply system includes a data processing system and at least one power supply. The data processing system outputs a power source ON/OFF signal to drive the power supply to switch either in a working state or a sleeping state. The power supply includes a signal integration unit and a communication unit. The signal integration unit receives a working parameter of the power supply and outputs a first ON/OFF signal to drive the data processing system to output the power ON/OFF signal to switch the state of the power supply state. The communication unit is linked to the signal integration unit to receive the working parameter and output the working parameter to a communication network. The administrators can acquire the working parameter through a remote control equipment and control the power supply at the remote site.

15 Claims, 4 Drawing Sheets

REMOTE CONTROLLED POWER SUPPLY SYSTEM

FIELD OF THE INVENTION

The present invention relates to a remote controlled power supply system and particularly to a system allowing remote observation of power supply status and control ON/OFF of the power supply in a remote manner.

BACKGROUND OF THE INVENTION

A conventional control system for multiple power supplies (used on servers, uninterrupted power system and the like), referring to FIG. 1, generally includes multiple sets of power supplies 91 in a cabinet or multiple cabinets, or operating independently at different locations. The power supplies 91, aside from connecting to individual loads, also are connected to a data processing system 92 which can be installed on a bus panel in the same cabinet or a computer connected to the power supplies 91 through wires. The data processing system 92 receives the power from the power supplies 91 to perform operation. Output and abnormal conditions of the power supplies 91 are read by the data process system 92 and sent to a remote control equipment 93 via a communication means so that the administrators can be remotely informed of operation status of the individual power supplies 91 and whether malfunction occurs to the power supplies 91 through the remote control equipment 93.

The aforesaid architecture has been implemented for years. But malfunction of the power supplies 91 still takes place occasionally and results in machine down, data loss and system interruption. It mainly caused by flaws of control circuit architecture of the power supplies 91. First, the conventional power supplies 91 transmit data to the data processing system 92 through $I^2C$ (bus panel or computer motherboard), then the data processing system 92 interprets and transmits information to the remote control equipment 93. However, in the event that some data processing system 92 does not support $I^2C$ operation is disabled (some computer motherboards do not provide support needed).

Moreover, the address setting of $I^2C$ of the data processing system 92 could be different from the power supplies 91 and result in errors and incorrect data access. For instance, $I^2C$ address 0x25 originally aimed to transmit computer CPU temperature, but the power supply end 91 may be set for transmitting the internal temperature of the power supplies 91. The different information at two ends could cause access errors of the data processing system 92, and the administrators at the remote end cannot acquire the actual conditions of the power supplies 91.

Another drawback that is difficult to eliminate is machine down of the data processing system 92 that results in failure of $I^2C$ data access through the data processing system 92. And the remote control equipment 93 cannot get the correct information. Whether the power supplies 91 function correctly or incorrectly, the administrators cannot get the accurate status remotely.

There is another condition in which the data processing system 92 has to receive the power through the power supplies 91 for operating. In the event that the power supplies 91 malfunctions, the data processing system 92 also cannot function normally, and the remote control equipment 93 cannot get any data to judge whether the malfunction occurs to the power supplies 91 or the data processing system 92. As a result, troubleshooting is difficult.

All the aforesaid problems still exist in the conventional circuit architecture. There are still rooms for improvement, especially in terms of total system stability.

SUMMARY OF THE INVENTION

In view of the convention control technique that causes operation interruption of a system used to transmit control information once the power supply malfunctions and results in loss of the control information of the entire power supply system and makes controlling the power supply not possible, the primary object of the present invention is to provide an improved control circuit architecture to enable the administrators to distinguish malfunction of a power supply or a control system to reduce problem determination time and facilitate problem elimination more quickly.

The present invention provides a remote controlled power supply system which includes a data processing system and at least one power supply. The data processing system outputs a power source ON/OFF signal to drive the power supply to switch either in a working state or a sleeping state. The power supply includes a signal integration unit and a communication unit. The signal integration unit receives a working parameter of the power supply and outputs a first ON/OFF signal to drive the data processing system to output the power ON/OFF signal to switch the state of the power supply. The communication unit is linked to the signal integration unit to receive the working parameter and output the working parameter to a communication network. Hence administrators can obtain status data of the power supply in a remote manner through the communication network. Moreover, the administrators can read the working parameter through a remote control equipment displayed the working parameter. The remote control equipment also can send a remote ON/OFF signal to the communication unit. The signal integration unit can read the remote ON/OFF signal through the communication unit to output the first ON/OFF signal to drive the data processing unit to output the power source ON/OFF signal to switch the state of the power supply. Thus the administrators can monitor and control the power supply operation conditions in a remote manner.

The foregoing, as well as additional objects, features and advantages of the invention will be more readily apparent from the following detailed description, which proceeds with reference to the accompanying embodiments and drawings. The embodiments serve merely for illustrative purpose and are not the limitation of the invention.

DETAILED DESCRIPTION OF THE PREFERRED EMBODIMENTS

Figure 1:
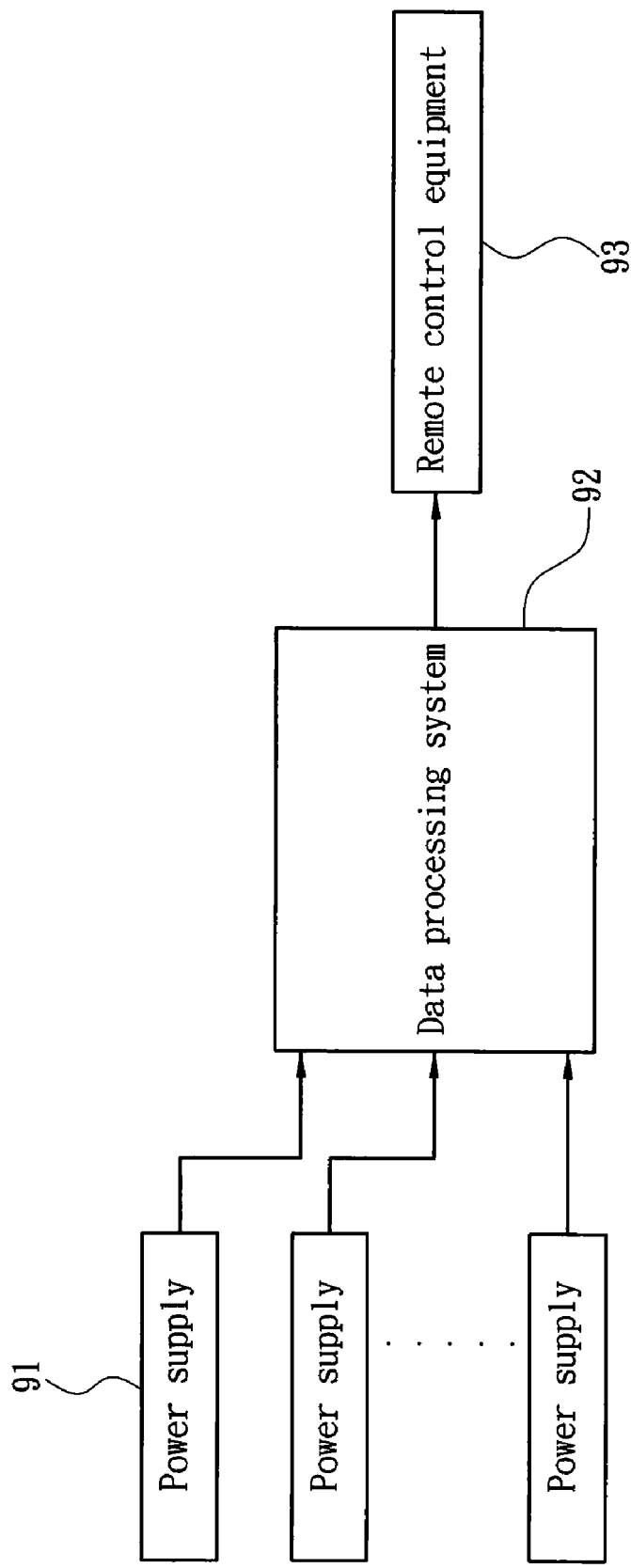
FIG. 1 is a block diagram of a conventional control architecture.
Figure 2:
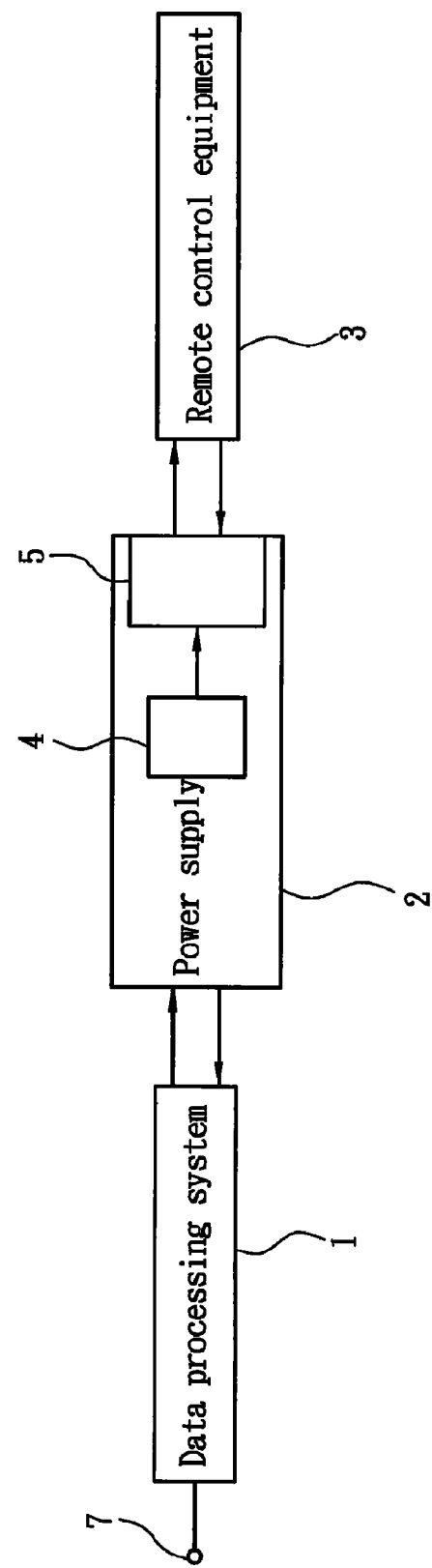
FIG. 2 is the block diagram of a fundamental architecture of the present invention.

The present invention aims to provide a remote controlled power supply system. Refer to FIG. 2 for the fundamental circuit architecture of the present invention. The power supply system according to the present invention includes a data processing system 1 and at least one power supply 2. The power supply 2 may be a single set or consist of multiple sets with multiple outputs. Thus, the data processing system 1 can connect to one or more sets of power supply 2 correspondingly. FIG. 2 shows the data processing system 1 is connected to only one set of power supply 2. The data processing system 1 outputs a power source ON/OFF signal to drive the power supply 2 to switch to a working state or a sleeping state (the working state and sleeping state aim to meet ATX power supply specifications that is a technique known in the art, thus details are omitted herein). The data processing system 1 may be a computer motherboard 10 activated through an ON/OFF switch 7. An embodiment is depicted associated with FIG. 4 later. The power supply 2 has an input end to receive input power and at least one output end to deliver output power that are not shown in FIG. 2. The output end is connected to a load which also is not shown in the drawings. The power supply equipped with the input end and output end is a technique known in the art, thus is not shown in the drawings. One or more of the output ends of the power supply 2 drive at least one load, wherein the load may also include the data processing system 1. Hence the power supply 2 may also be the power source of the data processing system 1. However, this is not the limitation, namely the data processing system 1 may get its power source from other sources than the power supply 2. The power supply 2 includes a signal integration unit 4 and a communication unit 5. The signal integration unit 4 receives a working parameter of the power supply 2. The working parameter may be an output voltage, an internal temperature or fan rotation speed, or any one or a combination thereof. The signal integration unit 4 sends the working parameter through the communication unit 5 to a communication network. A remote control equipment 3 is provided linking to the communication network to receive the working parameter. The working parameter is displayed on the remote control equipment 3 to provide administrators the status of the power supply 2. The remote control equipment 3 also can send a remote ON/OFF signal under operation of users to the communication unit 5. The signal integration unit 4 reads the remote ON/OFF signal through the communication unit 5 to output a first ON/OFF signal. The first ON/OFF signal is sent to and drive the data processing unit 1 to output the power source ON/OFF signal to switch the state of the power supply 2. Therefore, the administrators at a remote site can monitor the status of the power supply 2 through the signal integration unit 4, the communication unit 5 and the remote control equipment 3. Through the remote control equipment 3 the remote ON/OFF signal can be sent to switch the power supply 2 to enter the working state or the sleeping state. The signal integration unit 4 and communication unit 5 may be integrated on a circuit board to connect to the main circuit board of the power supply 2 in a module manner. Another approach is to pre-install the signal integration unit 4 and communication unit 5 on the main circuit board of the power supply 2 in designing the power supply 2. Whether the signal integration unit 4 and communication unit 5 are integrated on an independent circuit board or install on the main circuit board of the power supply 2 directly, either of them is within the scope of the present invention. Moreover, whatever the implementation condition of the signal integration unit 4 and communication unit 5, their power source is provided by standby power of the power supply 2. The power supply 2 can provide the standby power once it is connected to commercial power, and is in the sleeping state and ready to start. By supplying the standby power to the signal integration unit 4 and communication unit 5, they can normally monitor the status of the power supply 2. The technique of the standby power also is known in the art, thus details are omitted.

Figure 3:
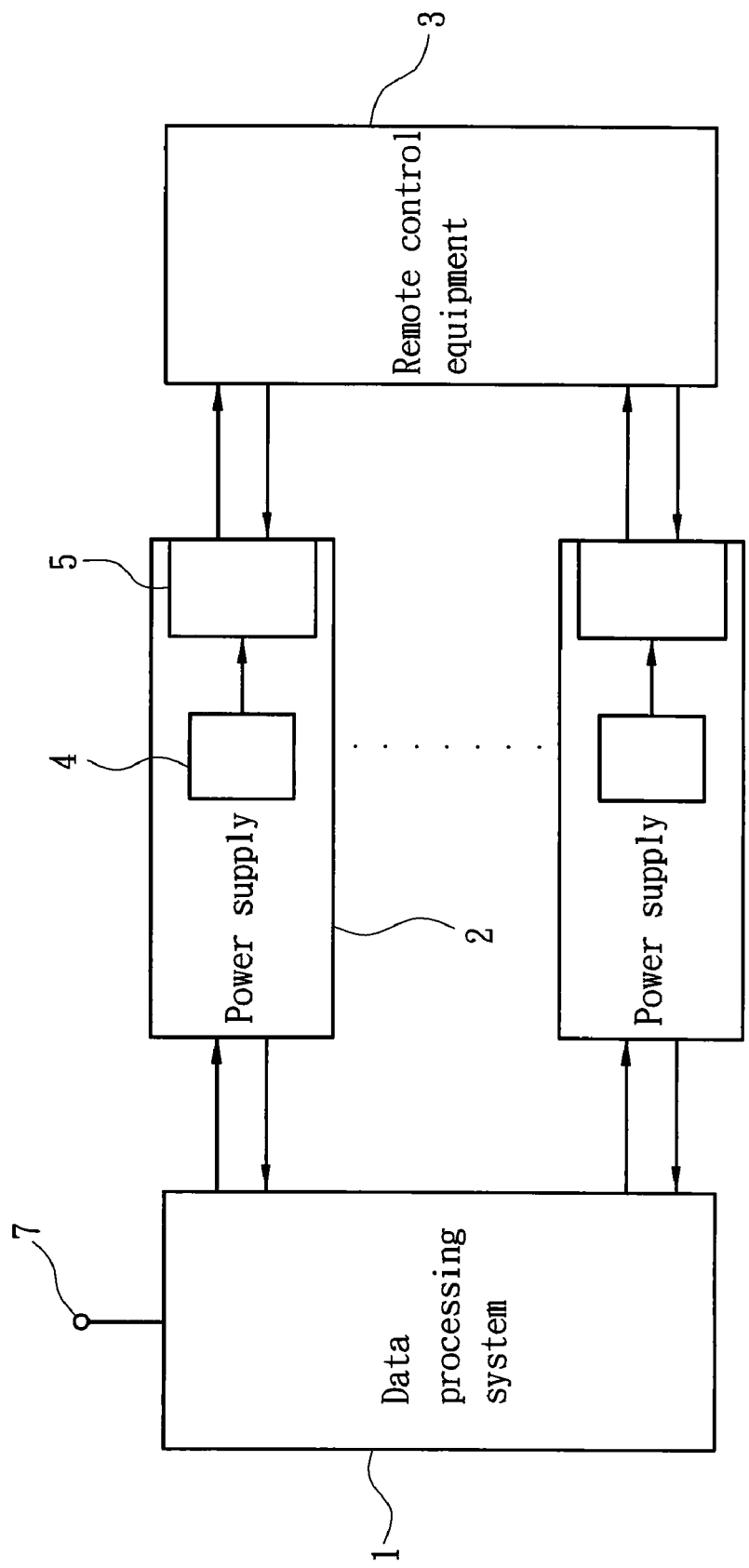
FIG. 3 is the block diagram of an extended architecture of the present invention.

The circuit architecture shown in FIG. 2 can be expanded as shown in FIG. 3, in which the data processing system 1 is a bus panel connecting to a plurality of power supplies 2 each power supply 2 has the signal integration unit 4 and the communication unit 5. Through the signal integration unit 4 and communication unit 5 a working parameter of each power supply 2 is sent individually to the remote control equipment 3. The remote control equipment 3 also can send the remote ON/OFF signal back to a selected power supply 2 to switch to the working state or sleeping state.

Figure 4:
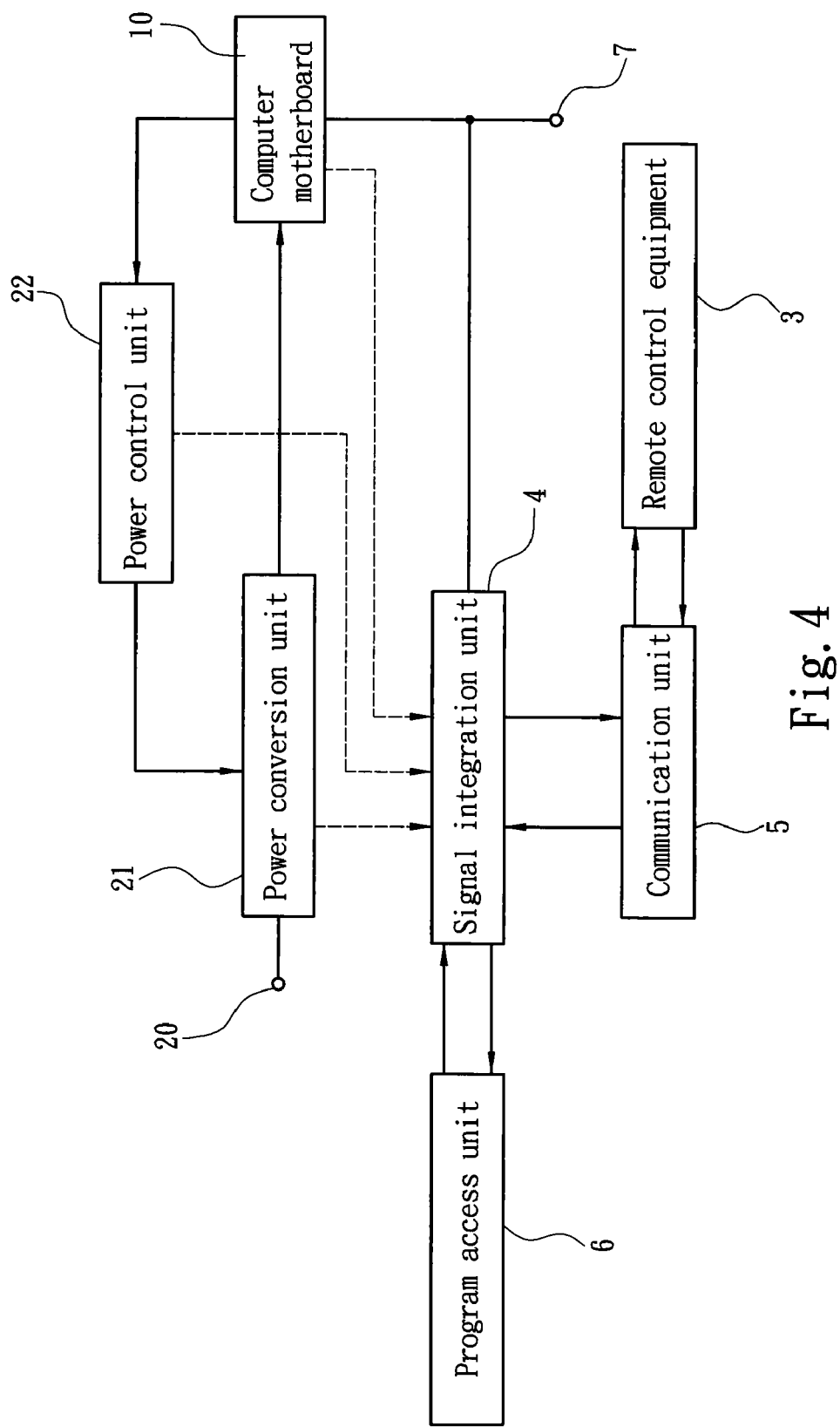
FIG. 4 is the block diagram of an embodiment of the architecture of the present invention.

Refer to FIG. 4 for an embodiment of the architecture shown in FIG. 2. The power supply 2 includes an input end 20, a power conversion unit 21 and a power control unit 22. The data processing system 1 is a computer motherboard 10 connected to an ON/OFF switch 7. The administrators can activate the ON/OFF switch 7 to generate a second ON/OFF signal to drive the data processing unit 1 (namely the computer motherboard 10 shown in FIG. 4) to output the power source ON/OFF signal to switch the state of the power supply 2. In the event that the power supply 2 is in the sleeping state, by activating the ON/OFF switch 7 the second ON/OFF signal is generated. The computer motherboard 10 receives the second ON/OFF signal and sends the power source ON/OFF signal to the power control unit 22 of the power supply 2. The power control unit 22 in turns activates the power conversion unit 21 to output power to a load for operation. It is to be noted that the power control unit 22 controls ON time series of the power supply 2, including execution of air fan operation and rotation speed, and internal temperature detection. The technique of the power control unit 22 to execute the aforesaid functions is known in the art, thus details are omitted in the drawings and discussion. The signal integration unit 4 can selectively receive the output voltage, the internal temperature or the air fan rotation speed or a combination thereof from the power conversion unit 21 or the power control unit 22. The signal integration unit 4 can also receive a system status signal representing an operation state of the computer motherboard 10. Then the communication unit 5 sends the working parameter obtained from the signal integration unit 4 to the remote control equipment 3 via the communication network so that the remote control equipment 3 can display the status of the power supply 2 and the data processing system 1. Furthermore, the signal integration unit 4 may also connect to a program access unit 6 which stores a programmable human-machine interface. The signal integration unit 4 can access the human-machine interface and integrate the working parameter and human-machine interface. The remote control equipment 3 can access the working parameter and human-machine interface through the communication unit 5. The program access unit 6, via network linking of the signal integration unit 4, the communication unit 5 and the remote control equipment 3, may store an updated human-machine interface from the remote control equipment 3 so as to update the human-machine interface between the signal integration unit 4 and remote control equipment 3. Similarly, the signal integration unit 4, the communication unit 5 and the program access unit 6 may be integrated on a circuit board and connected to the power supply 2, or pre-install on the main circuit board of the power supply 2.

Referring to FIG. 4, assumed that the signal integration unit 4 receives the system status signal representing the operation status of the computer motherboard 10 such as the output voltage, the internal temperature, or the air fan rotation speed, and the computer motherboard 10 is down during the power supply 2 is operating, the system status signal of the computer motherboard 10 down is sent back through the signal integration unit 4 and the communication unit 5 to the remote control equipment 3 to enable the administrators to realize the source of malfunction and fix the malfunction. For instance, if the air fan rotation speed is lower and temperature rises in the power supply 2, the remote control equipment 3 detects the working parameter and sends the remote ON/OFF signal which is converted by the signal integration unit 4 to the first ON/OFF signal to the computer motherboard 10. Then the computer motherboard 10 generates the power source ON/OFF signal to the power control unit 22 to enable the power supply 2 to enter the sleeping state from the working state to wait inspection. Or the administrators can send the remote ON/OFF signal again to restart the power supply 2 in the same way and continuously monitor the operation status after restart.

As a conclusion, compared with the conventional control circuit which sends the working parameter of the power supply 2 to the data processing system 1 then transfers to the remote end, the present invention collects the working parameter in the power supply 2 and sends to the remote end through the communication network without sending back to the data processing system 1, hence even if the main output of the power supply 2 malfunctions or unstable, or the data processing system 1 is down, the signal integration unit 4 can still collect the working parameter and send to the remote control equipment 3 to prevent the aforesaid problems occurred to the conventional technique. The communication network between the communication unit 5 and remote control equipment 3 can be network cables or a wireless network, and may also be a combination of the network cables and the wireless network. The communication unit 5 and remote control equipment 3, as long as able to provide effective transmission of the working parameter and remote ON/OFF signal, have no restriction in communication formats between them. In short, the present invention provides a significant improvement over the conventional technique.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A remote controlled power supply system comprising:
    a data processing system to output a power source ON/OFF signal; and
    at least one power supply driven by the power source ON/OFF signal to switch to a working state or a sleeping state, wherein the power supply includes:
    a signal integration unit to receive a working parameter of the power supply and output a first ON/OFF signal to drive the data processing system to output the power source ON/OFF signal to switch the state of the power supply; and
    a communication unit connected to the signal integration unit to receive the working parameter and send the working parameter to a communication network.

2. The remote controlled power supply system of claim 1, wherein the communication unit establishes a signal transmission link with a remote control equipment through the communication network, the remote control equipment receives and displays the working parameter through the communication network.

3. The remote controlled power supply system of claim 2, wherein the remote control equipment sends a remote ON/OFF signal to the communication unit, the signal integration unit receives the remote ON/OFF signal through the communication unit to output the first ON/OFF signal to drive the data processing unit to output the power source ON/OFF signal to enable the power supply to enter the working state or the sleeping state.

4. The remote controlled power supply system of claim 2, wherein the communication network between the communication unit and the remote control equipment is a network cable.

5. The remote controlled power supply system of claim 2, wherein the communication network between the communication unit and the remote control equipment is a wireless network.

6. The remote controlled power supply system of claim 2, wherein the communication network between the communication unit and the remote control equipment is a combination of a network cable and a wireless network.

7. The remote controlled power supply system of claim 1, wherein the signal integration unit is connected to a program access unit which stores a programmable human-machine interface, the signal integration unit accessing the programmable human-machine interface and integrating the working parameter and the human-machine interface and sending the working parameter and the human-machine interface to the communication network through the communication unit.

8. The remote controlled power supply system of claim 7, wherein the signal integration unit, the communication unit and the program access unit are integrated on an integrated circuit board and connected to the power supply.

9. The remote controlled power supply system of claim 7, wherein the communication unit receives an updated human-machine interface through the communication network and writes into the program access unit through the signal integration unit.

10. The remote controlled power supply system of claim 1, wherein the signal integration unit and the communication unit are integrated on a circuit board and connected to the power supply.

11. The remote controlled power supply system of claim 1, wherein the data processing unit is connected to an ON/OFF switch which is actuated by administrators to generate a second ON/OFF signal to drive the data processing unit to output the power source ON/OFF signal to switch the state of the power supply.

12. The remote controlled power supply system of claim 1, wherein the working parameter is selected from the group consisting of output voltages, internal temperatures and air fan rotation speeds of the power supply and combinations thereof.

13. The remote controlled power supply system of claim 12, wherein the signal integration unit further accesses a system status signal representing operation conditions of the data processing system and sends the system status signal through the communication unit to the remote control equipment which displays the conditions of the data processing system.

14. The remote controlled power supply system of claim 1, wherein the data processing system is a computer motherboard.

15. The remote controlled power supply system of claim 1, wherein the data processing system is a bus panel connecting to a plurality of power supplies.

* * * * *